(12) United States Patent
Gonzalez et al.

(10) Patent No.: US 9,712,870 B2
(45) Date of Patent: Jul. 18, 2017

(54) SYSTEM FOR CAPTURING AND MONITORING THE AMOUNT OF USERS WATCHING A MEDIA DEVICE

(71) Applicants: Dennis Gonzalez, Miami, FL (US); Jordan Cohen, Mahwah, NJ (US)

(72) Inventors: Dennis Gonzalez, Miami, FL (US); Jordan Cohen, Mahwah, NJ (US)

(*) Notice: Subject to any disclaimer, the term of this patent is extended or adjusted under 35 U.S.C. 154(b) by 8 days.

(21) Appl. No.: 14/302,055

(22) Filed: Jun. 11, 2014

(65) Prior Publication Data

US 2015/0365723 A1    Dec. 17, 2015

(51) Int. Cl.
| | |
|---|---|
| *H04N 21/442* | (2011.01) |
| *H04N 21/4415* | (2011.01) |
| *H04N 21/4223* | (2011.01) |
| *H04N 7/16* | (2011.01) |
| *H04N 21/234* | (2011.01) |
| *H04N 21/2543* | (2011.01) |
| *H04N 21/258* | (2011.01) |
| *H04N 21/658* | (2011.01) |

(52) U.S. Cl.
CPC ....... *H04N 21/44218* (2013.01); *H04N 7/162* (2013.01); *H04N 21/23418* (2013.01); *H04N 21/2543* (2013.01); *H04N 21/25866* (2013.01); *H04N 21/25875* (2013.01); *H04N 21/4223* (2013.01); *H04N 21/4415* (2013.01); *H04N 21/6582* (2013.01)

(58) Field of Classification Search
CPC ............. H04N 21/466; H04N 21/4223; H04N 21/44218; H04N 21/42201; H04N 21/4532; H04N 7/18; H04N 21/4334; H04N 21/454; H04N 7/163; H04N 21/443
See application file for complete search history.

(56) References Cited

U.S. PATENT DOCUMENTS

| | | | | |
|---|---|---|---|---|
| 2010/0046797 | A1* | 2/2010 | Strat | G06K 9/00778 382/103 |
| 2011/0161997 | A1* | 6/2011 | Rourk | H04N 21/25435 725/5 |
| 2011/0173662 | A1* | 7/2011 | Beppu | H04N 21/466 725/46 |
| 2013/0312018 | A1* | 11/2013 | Elliott | H04N 21/45 725/12 |
| 2014/0165083 | A1* | 6/2014 | Atkin | G06Q 30/02 725/5 |

\* cited by examiner

*Primary Examiner* — Robert Hance
*Assistant Examiner* — Susan X Li
(74) *Attorney, Agent, or Firm* — Christian Sanchelima; Jesus Sanchelima

(57) ABSTRACT

A system for detecting how many users are watching a given media device, including audio/visual output means such as a television or computer monitor, a monitoring device such as a television or computer monitor, a video capturing device, server means, and a programmable database that registers the users watching a given media content during a predetermined time in a given space. Monitoring means continuously scans the given space for new, unregistered users to charge them for viewing the media content. Once users have registered and paid for the media content, the content is released from the system's servers or a third party's servers and displayed on the audio/visual output means.

7 Claims, 7 Drawing Sheets

SYSTEM FOR CAPTURING AND MONITORING THE AMOUNT OF USERS WATCHING A MEDIA DEVICE

BACKGROUND OF THE INVENTION

1. Field of the Invention

The present invention relates to a system for monitoring the amount of users watching given broadcasted content from the same media device.

2. Description of the Related Art

Several systems for collecting information over media devices have been designed in the past. None of them, however, include a system that uses a camera to monitor how many users are watching content broadcast by a media device.

Applicant believes that a related reference corresponds to published U.S. patent application No. US 20100016011 filed on Jul. 15, 2008 by Motorola, Inc. for a method for collecting usage information on wireless devices for rating purposes.

Although the reference discloses of a method to gather information it differs from the present invention because it does not disclose of a system that uses a monitoring device to monitor and analyze the amount of users watching a media device in a given viewing venue. The Motorola reference teaches of a method that collects and records the channels the participant is watching and during what time intervals the channels are viewed. The software application subject of the Motorola reference then transmits the collected usage to the ratings server. The present invention provides a way to monitor and track the amount of users in a given space watching a program so that the system can charge per user watching the program.

The Motorola reference does not provide a solution to be able to determine how many individuals are watching a program, only how many media devices are tuned into a particular channel. However, multiple users may be watching the same media device and the Motorola reference does not teach of a method to determine how many individual users are watching the same program. Thus, rendering it unable to charge per viewer the way the present invention does. The present invention teaches of a system that employs a monitoring device, programmable databases, and a server to track the actual individual users watching the same program on the same media device.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for monitoring how many users are watching a given broadcasted content in a given area over the course of a predetermined time.

It is another object of this invention to provide a means to charge by the amount of viewers watching a given broadcasted content, such as a movie, television show, festival, or concert.

It is yet another object of this invention to provide such a system that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
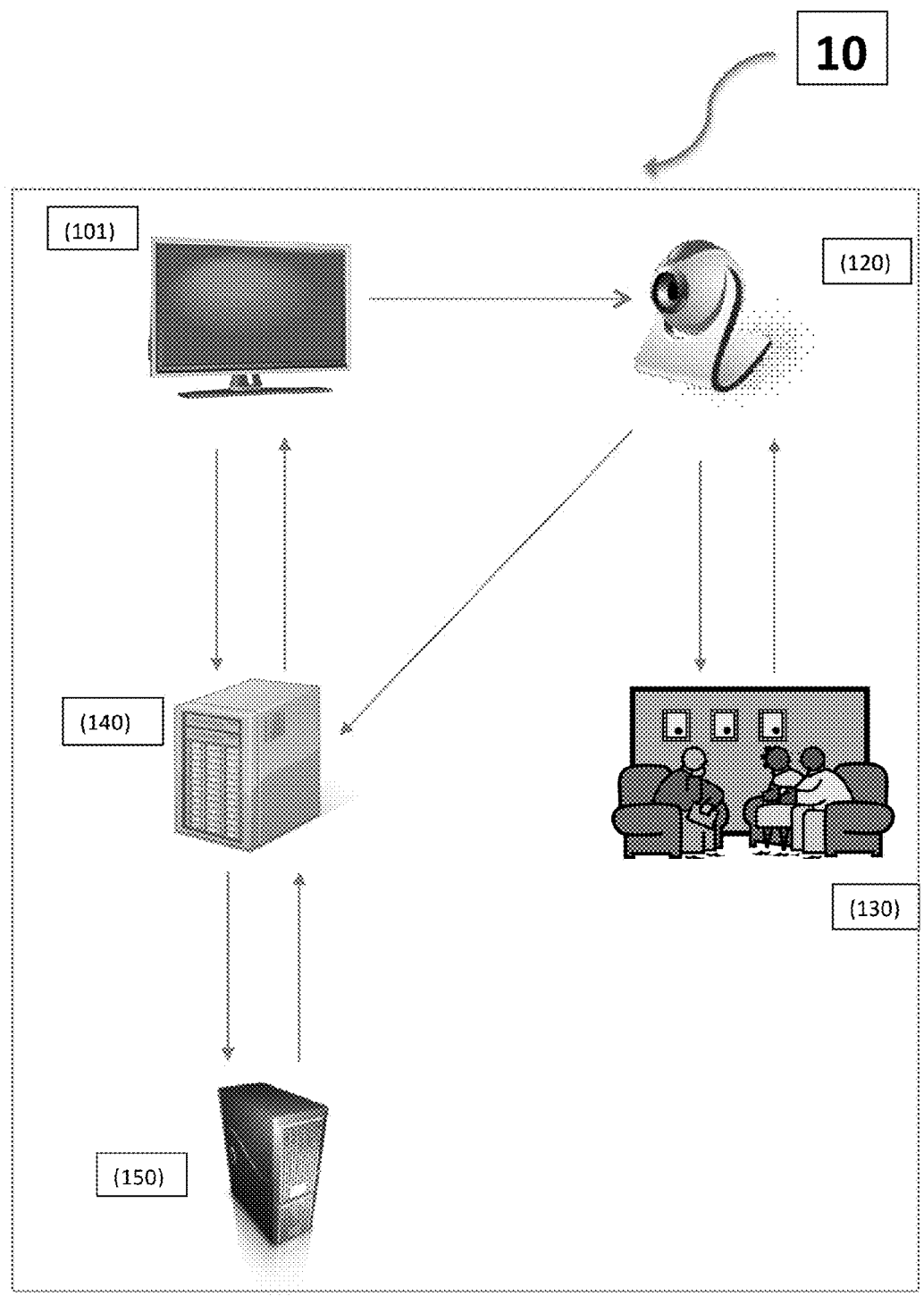
FIG. 1 represents a schematic illustrating an operating environment in which exemplary embodiments may be implemented.

Referring now to the drawings, where the present invention is generally referred to with numeral 10, it can be observed that it basically includes content audio/visual output means 101, a monitoring device 120, server means 140, and programmable database 150.

As shown in FIG. 1, content audio/visual output means 101 such as a television or computer display device, is used to broadcast media content, such as a television program, movie, pictures, music, music videos, etc. hereinafter collectively referred to as "content". Monitoring device 120 can be built-in to content audio/visual output means 101, as shown in FIG. 1, and is used to scan a predetermined space to determine how many users are watching output means 101. In an alternate embodiment, monitoring device 120 can be used to track a user's eyes to ensure that the user being charged is actually watching output means 101. This avoids someone being charged for merely walking past video capturing device 120 without actually watching the broadcasted content. Invalid charges are also avoided by employing a time requirement. Users must have been watching a given broadcast for at least a predetermined amount of time before they are charged. This prevents non-registered bystanders from being charged. Software in programmable databases 150 recognizes facial patterns and other identifying characteristics and includes a memory to record the users watching a given broadcast.

The system allows a user to leave predetermined space 130 and come back again. Data information captured by monitoring device 120 is transmitted to server 140. In an alternate embodiment, users can be scanned initially, one at a time, to be registered with the system. Monitoring device 120 continues scanning predetermined space 130 and any new viewers in predetermined space 130 viewing the content for more than five minutes is charged for the content through the new user's account or through a registered user's account if the new user is not registered. Thus, the system is scanning for non-registered users who have met the predetermined viewing time requirement to be charged.

Server 140 includes programmable databases 150 that store information in connection with the different pricing options for the content, set prices for each user in given space 130, and user profile information. In one of the embodiments, an algorithm can be used to match the users with the process. Programmable database 150 further logs the facial patterns of the users in predetermined space 130 watching a given program. Programmable databases 150 further include an array of content that can be watched by the users once payment is made. In an alternate embodiment, this content is stored in servers of other media providers, such as Apple, Amazon, etc. Monitoring device 120 and programmable databases 150 analyze the users in a room and calculate a price to watch the media content. Once payment is made, the present system is authorized or authorizes a 3$^{rd}$ party media provider to release the desired media content to the users in the given space. Facial and other biometric features of a user can be identified using one of the methods already used in the art, such as KINECT, http://research.microsoft.com/en-us/news/features/kinectfacereco-103111.aspx.

Figure 2:
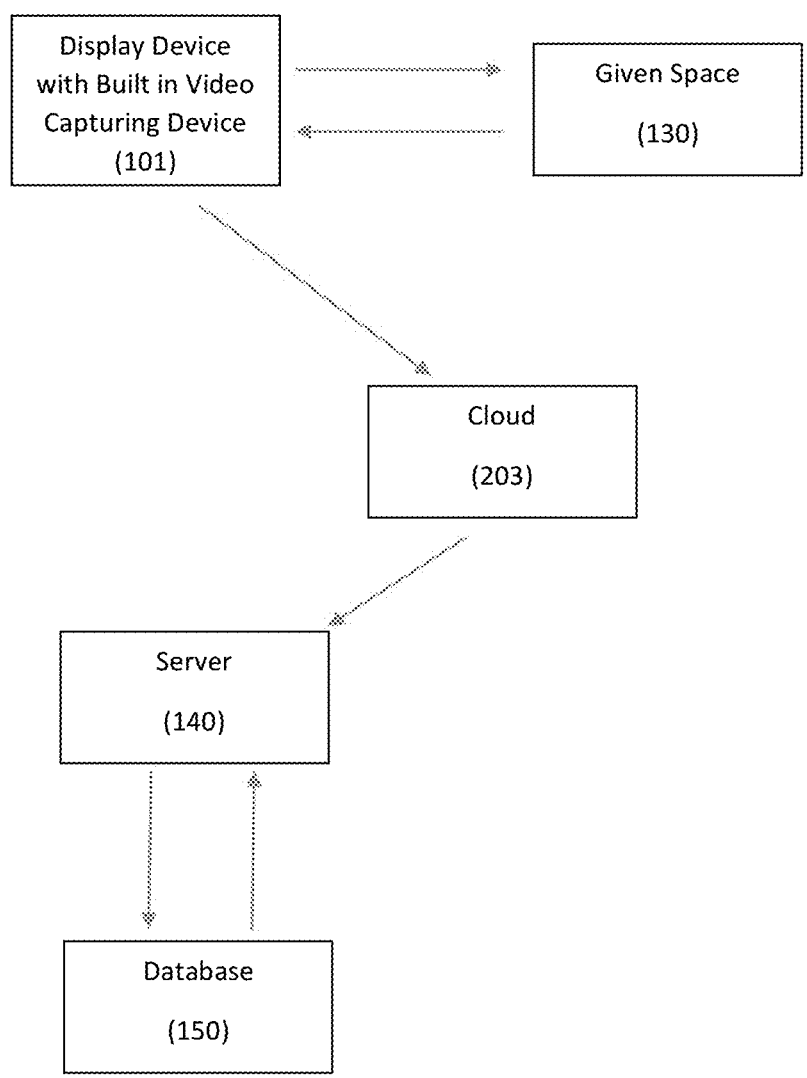
FIG. 2 is diagram showing a predetermined space being scanned by a video capturing device built-in to an Internet-enabled display device that communicates with the system's servers.

FIG. 2 shows monitoring device 120 being used to capture the amount of attendees at a concert or festival. In one embodiment, monitoring device 120 is Internet-enabled and transfers information to server 140 via cloud 203. From there, programmable databases 150 assigns each attendee with a price to view the content. Monitoring device 120 includes at a minimum a camera but can include other devices such as infrared or thermal devices to differentiate different living beings.

Figure 3:
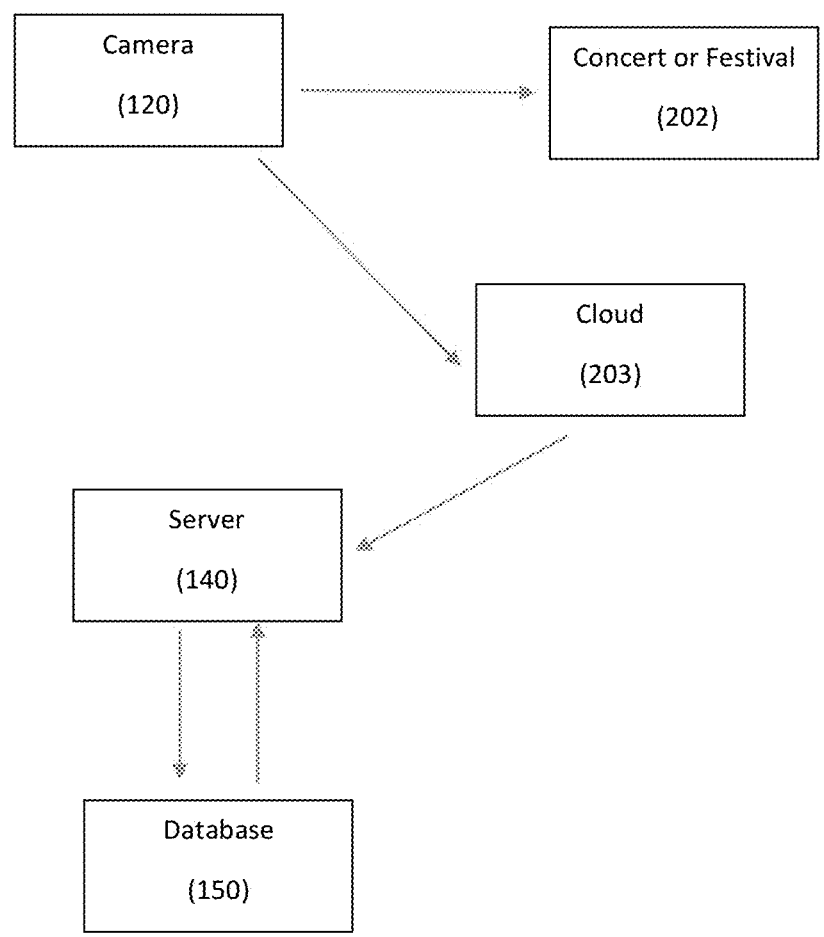
FIG. 3 is diagram showing an alternate embodiment wherein a predetermined space, such as a concert or festival, is being scanned by an Internet-enabled video capturing device that communicates with the system's servers.

FIG. 3 is an alternate embodiment wherein non-Internet enabled output means 101 is hardwired or connected via Bluetooth to an Internet enabled monitoring device 120. Monitoring device 120 scans space 130 and relays user information to server 140 via cloud 203. Programmable databases 150 within server 140 match the desired media content with the pricing options for each user in predetermined space 130. The pricing information is conveyed back to the system where a user or several users must cancel the balance before watching the desired content.

Figure 4:
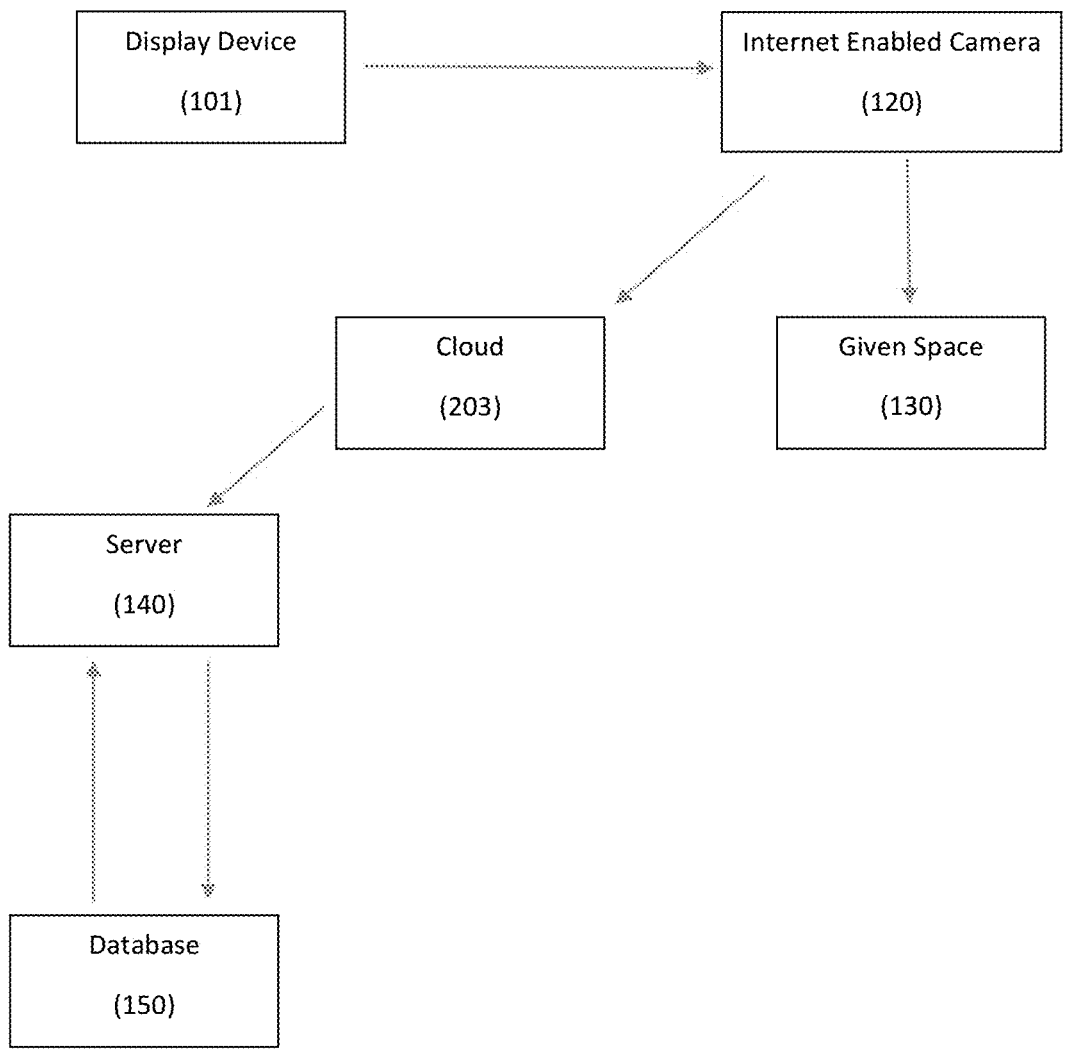
FIG. 4 is diagram showing an alternate embodiment wherein a predetermined space is being scanned by an Internet-enabled video capturing device hardwired to a display device. The Internet-enabled video capturing device communicates with the system's servers to determine how much each user has to pay to watch the media content.

FIG. 4 shows an alternate embodiment wherein Internet-enabled output means 101 is hardwired or connected via Bluetooth to a non-Internet enabled monitoring device 120. Monitoring device 120 scans space 130 and relays user information to Internet-enabled output means 101, which then sends the captured information to server 140 via cloud 203. Programmable databases 150 within server 140 match the desired media content with the pricing options for each user in predetermined space 130. The pricing information is conveyed back to the system where a user or several users must cancel the balance before watching the desired content.

Figure 5:
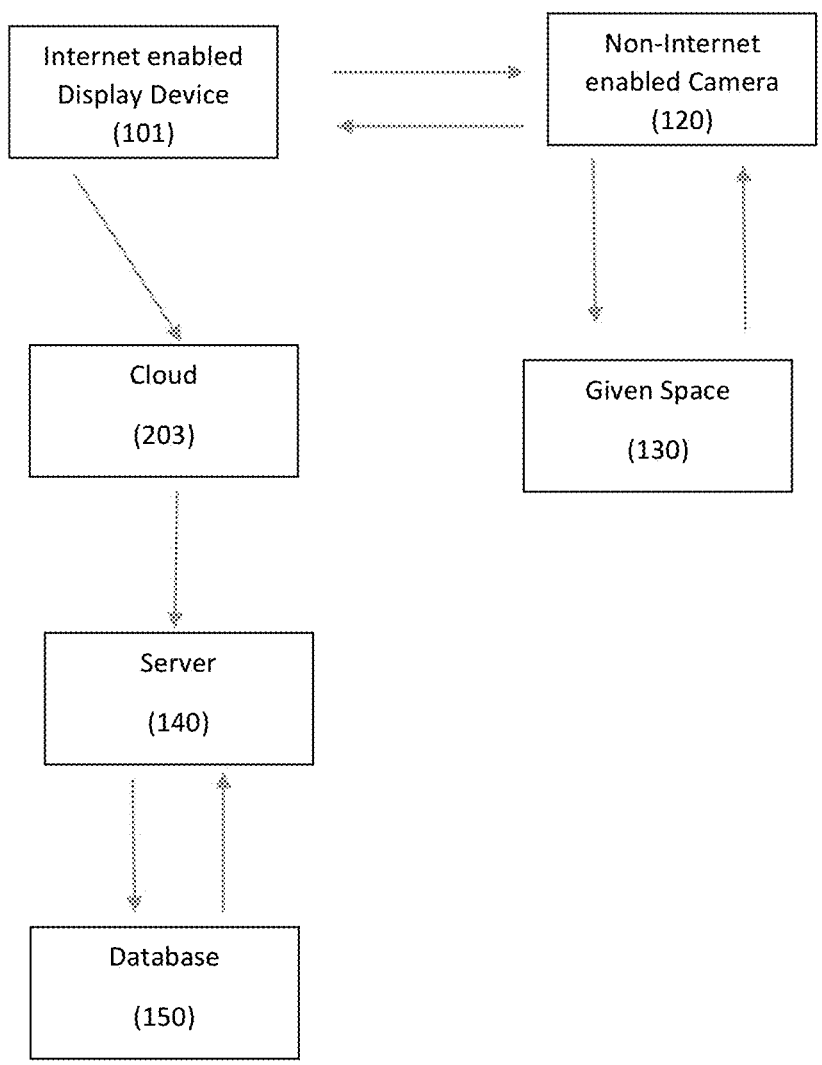
FIG. 5 is diagram showing an alternate embodiment wherein a predetermined space is being scanned by a non-Internet enabled video capturing device connected to an Internet enabled display device that communicates with the system's servers to come up with pricing to watch the desired content.
Figure 6:
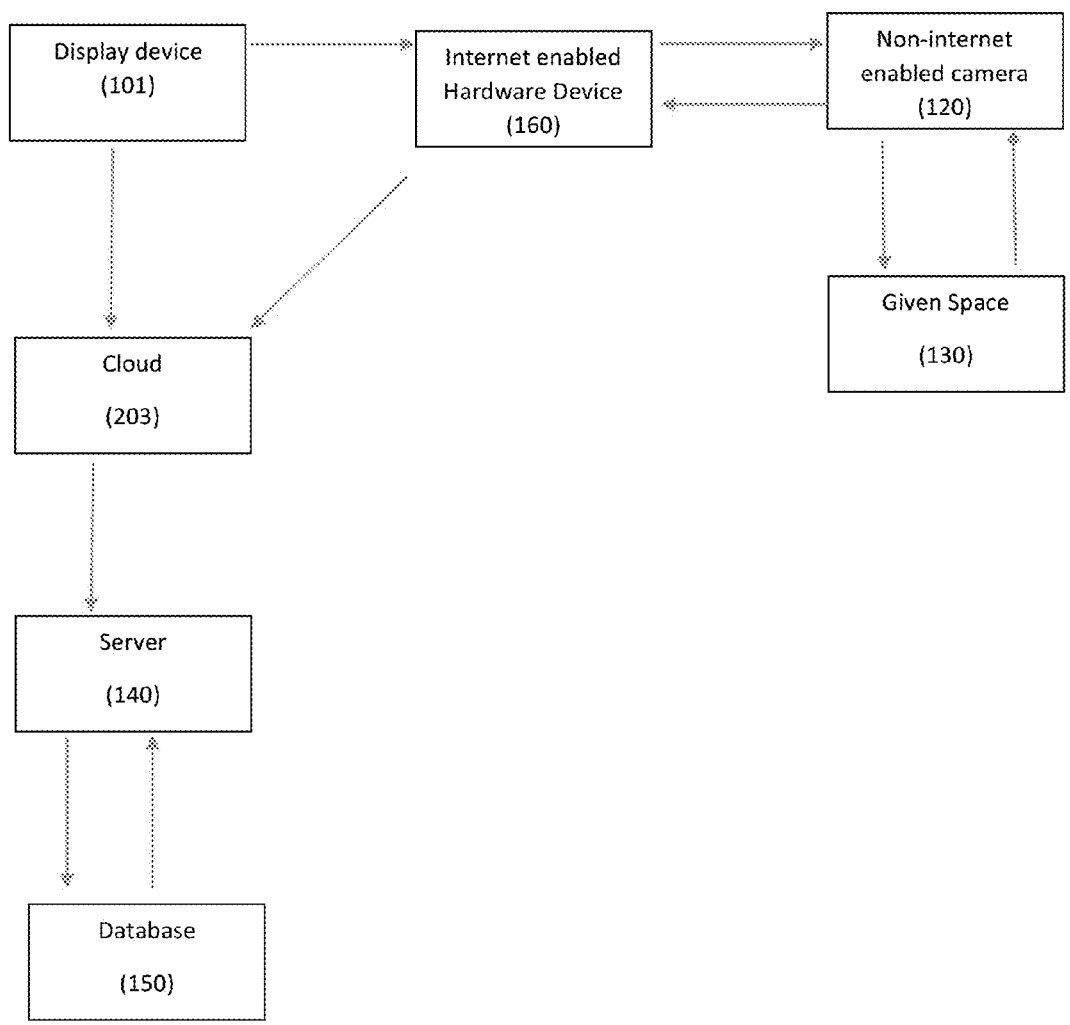
FIG. 6 is diagram showing an alternate embodiment wherein a predetermined space being scanned by a non-Internet enabled video capturing device connected to an Internet-enabled hardware device that communicates with the system's servers to provide pricing and payment options.
Figure 7:
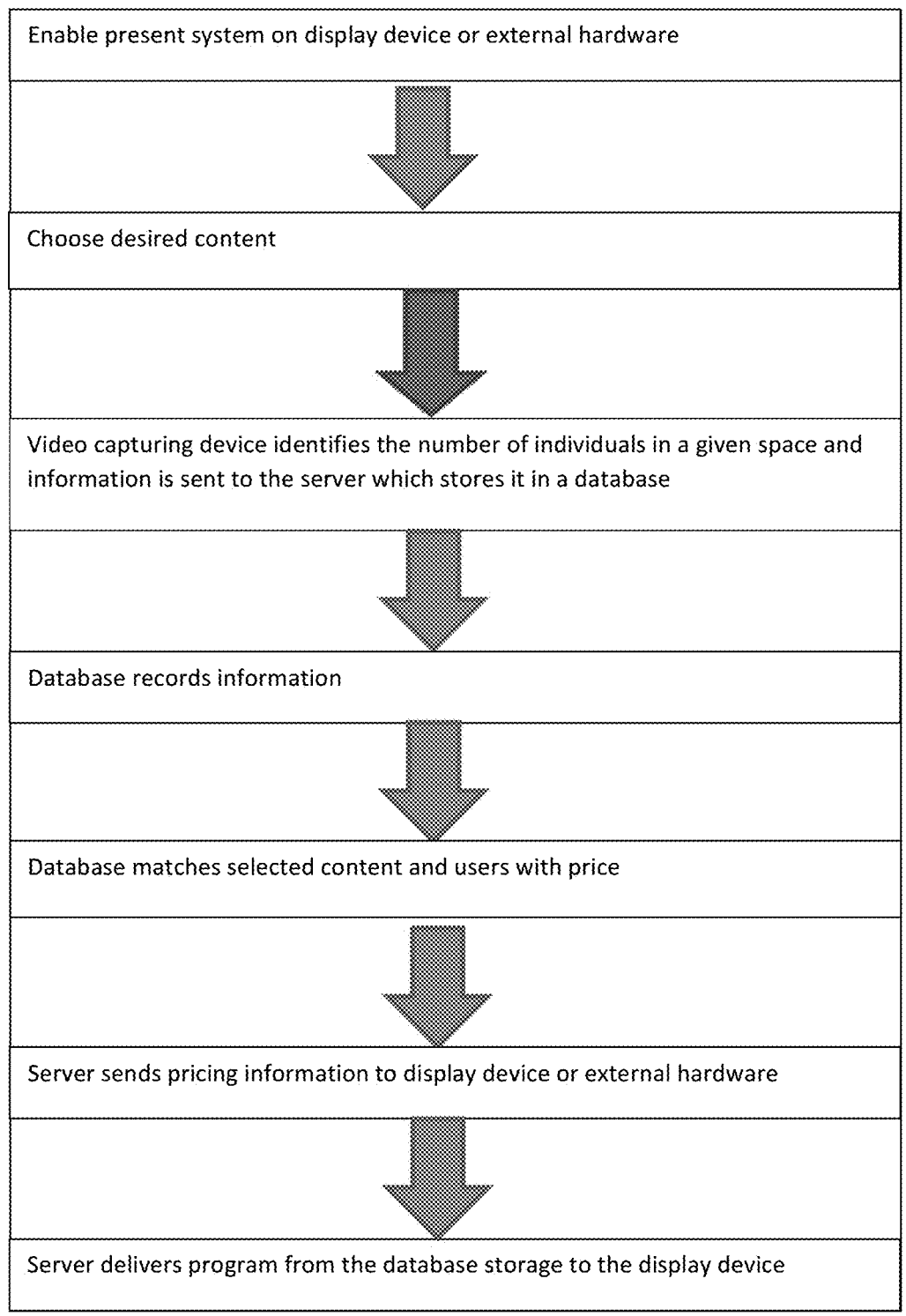
FIG. 7 is a flowchart outlining the steps in the process of the present system from the time a user enables a display device or external hardware to when the system's server delivers content to the display device.

FIG. 5 is an alternate embodiment wherein a non-Internet enabled video capturing device 120 is hardwired or connected via Bluetooth to Internet-enabled hardwire device 160. Video capturing device 120 scans space 130 and relays user information to Internet-enabled hardwire device 160, which then sends the captured information to server 140 via cloud 203. Programmable databases 150 within server 140 match the desired media content with the pricing options for each user in predetermined space 130. The pricing information is conveyed back to the system where a user or several users must cancel the balance before watching the desired content.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for detecting users watching content on a given media device, comprising:
   a) a global computer network;
   b) a monitoring device to scan a predetermined area and record a plurality of registered users and to determine, using biometrics, an identity of each of the registered users before displaying media content, said monitoring device to continually scan said predetermined area to determine each identified registered user's time facing said media content;
   c) a computerized server having a storage assembly with control software to register the identified registered users watching said media content in said predetermined area, said storage assembly further including a database for storing each of said registered users' biometric features, said storage assembly also including a database for storing said media content;
      wherein said computerized server processes a corresponding charge for each identified registered user for viewing the media content, wherein each said corresponding charge is based on the registered user's time facing the media content,
      wherein each identified registered user is only charged the corresponding charge if the registered user's time facing the media content is greater than a non-zero predetermined threshold, and
      if a viewer within the predetermined area does not face and view the media content, the viewer is not charged for viewing the media content.

2. The system set forth in claim 1 wherein said monitoring device continues to scan said predetermined area to determine presence of unregistered users.

3. The system set forth in claim 1 wherein said monitoring device registers and charges new, unregistered users who have been in said given space for a predetermined amount of time.

4. The system set forth in claim 1 wherein said biometrics includes eye recognition, facial recognition, height, and skin tone.

5. The system set forth in claim 1 wherein said media content includes movies, television shows, concerts, festivals, music videos, audio recordings, and pictures.

6. The system set forth in claim 1 wherein said monitoring device being a thermal device that differentiates different living beings.

7. The system of claim 1 wherein said monitoring device is built into said media device.

\* \* \* \* \*